United States Patent Office 3,557,271
Patented Jan. 19, 1971

3,557,271
MANUFACTURE OF NET-LIKE MATERIALS BY EXTRUSION
Theodore H. Fairbanks, West Chester, Pa., assignor to FMC Corporation, Philadelphia, Pa., a corporation of Delaware
Filed Dec. 11, 1967, Ser. No. 689,559
Int. Cl. B28b 3/20; D01d 5/20
U.S. Cl. 264—167
7 Claims

ABSTRACT OF THE DISCLOSURE

Manufacture of extruded net-like structures by providing voids in a shaped stream of flowable film-forming material wherein the said voids are produced by obstructing the stream in a direction generally perpendicular to its direction of flow at selected areas spaced from each other in a direction transverse to the direction of stream flow, and thereafter merging portions adjacent of such streams within the die nozzle at longitudinally spaced areas thereof to obtain said extruded net-like structure.

---

The present invention relates to an improved method and apparatus for making net-like structures by extrusion.

Disclosed in the prior art are various methods and apparatus for making net-like structures in which integral junctions are formed at locations at which mesh-forming strands meet or intersect. Typical of such prior disclosures are United States Pats. 2,919,467; 3,019,147 and 3,252,181. The equipment required with such known procedures, however, is generally complicatd and/or extremely precise and sensitive and, much too often, incapable of operating at speeds which are necessary for economical porduction of net-like structures. Accordingly, a primary object of this invention is to provide a generally new or improved and more satisfactory method and apparatus for making net-like structures by extrusion.

Another object is the provision of an extrusion method and apparatus in which the flow properties of the material being extruded are themselves utilized in providing a desired net-like structure.

Still another object of this invention is to provide a simple method for making net-like structures at comparatively high rates of production.

A further object is the provision of an improved and mechanically simple apparatus for making net-like structures by extrusion.

These and other objects are accomplished in accordance with the present invention by a method and apparatus wherein a continuous stream of flowing film-forming material, which is under pressure and confined in its width and thickness directions, is divided into a series of separate, generally streamlined flows, after which adjacents portions of such flows are merged only at longitudinally spaced inetrvals before being released from confinement and set.

In the manufacture of films by extrusion of a stream of film-forming material through a nozzle, particles of foreign matter within the nozzle often cause some deformation and perhaps division of the stream before it is extruded. Such deformed or divided stream of film-forming material may "heal" itself sufficiently before being extruded so that only minor imperfections appear in the resulting film.

Under a constant pressure applied to the film-forming material, this inherent characteristic of a deformed or divided stream of film-forming material to "heal" or blend itself together is not particularly strong. Thus, in instances in which the stream of film-forming material is actually divided at some location relatively close to the nozzle discharge orifice, the stream may issue therefrom as separate flows.

In the method of the present invention advantage is made of the weakness or inability of film-forming materials to rapidly "heal" or blend themselves together following deformation or division. More particularly, in the method of the present invention, a stream of film-forming material, moving through an extrusion nozzle of either flat or annular configuration and thus unconfined in only its direction of flow, is purposely obstructed at spaced locations within the nozzle itself to provide a series of separate, generally streamlined flows of film-forming material. The locations at which the stream of film-forming material is obstructed preferably all lie within a plane which extends transversely or across the nozzle, parallel to and spaced from its discharge orifice, and perpendicular to the direction of stream movement. The distance between these locations of obstruction and the nozzle discharge orifice is such that the streamlined flows do not normally have an opportunity to blend or merge together while still within the nozzle end, under conventional extrusion conditions, would issue from the nozzle as separate streams.

Subsequent to the intentional division of the stream of film-forming matrial within the nozzle in the method of the present invention, the separate streamlined flows of film-forming material which are provided are caused to merge or blend with each other only at longitudinally spaced intervals, also while still within the extrusion nozzle. The portions of these streamlined flows of film-forming material which remain separate from each other define voids or openings in the film-forming material which is ultimately extruded and which, when set, provides for a desired net-like structure.

In the apparatus or extrusion nozzle of the present invention, the division of the stream of film-forming material into a plurality of separate streamlined flows may be achieved by a series of equally spaced fixed rods which are located, as defined above, within a plane extending generally perpendicular to the direction of flow of the film-forming material and upstream and parallel to the nozzle discharge orifice. With such apparatus, a continuous stream of film-forming material is moved through the nozzle under a pressure, but one which periodically varies or pulsates. Thus, downstream from the fixed rods the flows of film-forming material remain separated from each other during periods at which maximum pressure is applied and move toward and merge with each other during the application of minimum pressure to the film-forming material.

The film-forming material which issues from the above-described nozzle, when set, provides for a net-like structure having voids or openings which are aligned both longitudinally and transversely or annularly thereof. The pattern of voids or openings resulting in the finished net-like structure can be changed, for example by varying the magnitude and/or frequency of the pressure applied to the film-forming material and/or by having adjacent fixed rods of the nozzle offset or in staggered relationship.

As an alternative construction, the above-described nozzle may further include projections of streamlined contour which are located between and downstream from the fixed rods. These projections extend only partially into the paths of the flows of film-forming material which issue from between the fixed rods and may be located along either or both ends of such paths. The operation of this modified nozzle is substantially the same as that described above, with the projections serving to encourage lateral movement of portions of the streamlined flows of film-forming material during periods when minimum pressure is applied to the film-forming material.

A further embodiment of the invention comprises a nozzle having a set of rods which are moved across or through a stream of film-forming material as it flows therethrough to thus divide the same into a series of separate, generally streamlined flows. More particularly, alternate rods are together moved across the path of the stream of film-forming material, in alternating sequence with the adjacent rods, at locations similar to those of the fixed rods of the first described embodiment.

In the practice of the method of the invention with the last-described apparatus, a stream of film-forming material passing through the nozzle under a constant pressure is first divided into a series of separate, streamlined flows as alternate rods are simultaneously projected therethrough. As such alternate rods are retracted, the rods adjacent thereto are projected through the separate streamlined flows to thus divide the same and cause portions of such streams to combine and, in effect, provide new streamlined flows. Voids or openings are formed in the streamlined flows of film-forming material in the areas at which such flows are obstructed by the rods.

By continuously repeating the above sequence of rod movements, the film-forming material, when extruded from the nozzle and set, provides a desired net-like structure having voids or openings which are aligned transversely or annularly of the structure but with only alternate voids or openings being aligned in a longitudinal direction thereof. Changes in the pattern of voids or openings in the finished net-like structure can be achieved by varying, for example, the frequency at which rods are projected and/or the duration such rods remain in the path of the film-forming material and/or the spacing of the rods.

A still further embodiment of the invention comprises a nozzle having a series of equally spaced, elongated deflectors which are of streamlined and symmetrical contour. These deflectors are positioned in the path of the stream of film-forming material and are each rotatable about a central axis located in substantially the same positions as the fixed rods of the first defined embodiment. More particularly, all of the deflectors are rotated or oscillated between positions extending parallel and perpendicular to the path of the film-forming material, with alternate deflectors being simultaneously moved to and from such positions in a sequence which alternates with the deflectors which are adjacent thereto.

The operation of this embodiment of the invention and the net-like structure which is provided are similar to that of the last-described nozzle structure.

The teachings of the present invention are applicable for use with a variety of film-forming materials, including materials which are thermoplastic, such as polyamides or superpolyamides, polyesters, polyvinyl chloride, copolymers thereof, polyolefins, cellulose acetates, metals, glasses, etc., natural or synthetic rubbers, thermosetting materials or wet-spinnable materials, such as viscose, cupro-ammonium cellulose, or carboxymethyl cellulose. Such materials may include various additives such as stabilizers, dyes, foaming agents, etc., if so desired.

The manner by which the extruded film-forming material is set will depend upon the particular material employed and thus may involve cooling, solvent removal or a chemical reaction to convert the same to a solid state.

For a greater understanding of this invention, reference is made to the following detailed description and drawing in which FIG. 1 is a fragmentary plan view of one embodiment of the apparatus of the present invention, with a portion thereof being removed;

Figure 1:
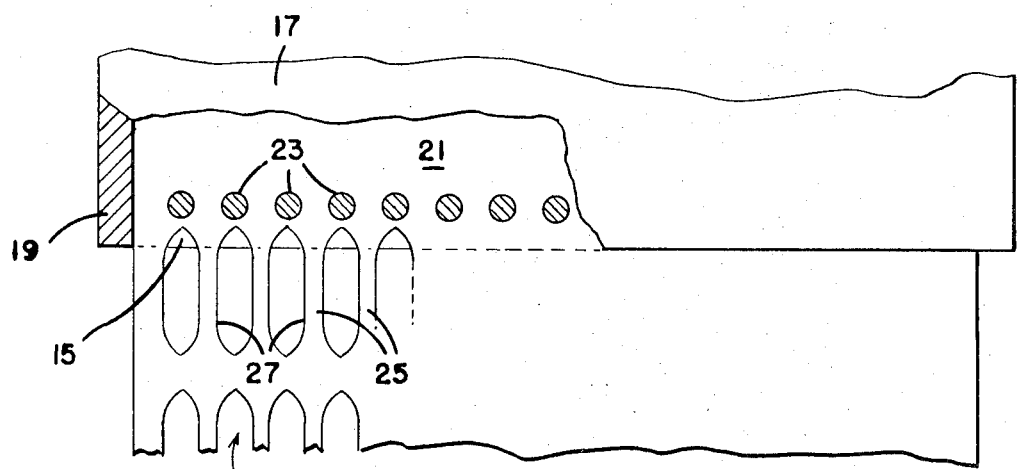

With reference to FIG. 1 of the drawing, the flat nozzle there illustrated includes spaced die lips or blades 15 and 17 which extend between end walls 19 and together define a passage into which film-forming material 21 is delivered. This nozzle passage terminates with a discharge orifice from which the film-forming material is extruded. Extending across the nozzle passage, inwardly of the discharge orifice thereof, is a series of equally spaced, fixed rods 23, each of which is of round or other streamlined contour. As shown, the rods 23 preferably all lie within a plane which extends transversely of the nozzle, parallel to its discharge orifice, and perpendicular to the direction of flow of the film-forming material.

In the practice of the method of the present invention with the nozzle shown in FIG. 1, a stream of film-forming material 21 is delivered through the nozzle passage under periodically varying or pulsating pressure and issues from between the rods 23 as separate streamline flows 25. The distance between the rods 23 and the nozzle discharge orifice is such that the streamlined flows of film-forming material 25 merges or blend together only during periods when the stream of film-forming material is under minimum pressure, whereby the unconnected portions of the flows 25 define voids or openings 27. This shaped film-forming material is set as it issues from the nozzle to provide a desired net-like structure 29.

Figure 3:
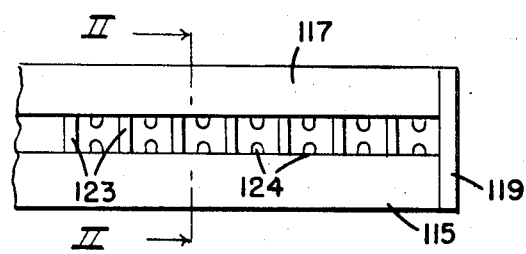
FIG. 3 is an end view of a portion of the apparatus shown in FIG. 2.
Figure 2:
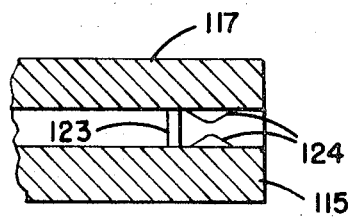
FIG. 2 is a fragmentary vertical section of a second embodiment of the apparatus taken along the line II—II of FIG. 3.

The nozzle embodiment shown in FIGS. 2 and 3 is similar to that shown in FIG. 1 in that it includes die lips or blades 115 and 117 and end walls 119, which together define a passage for a stream of film-forming material, and a series of fixed rods 123 which are located in the same positions as described above. In addition, this second embodiment of the invention is provided with fixed projections 124 which are of streamlined contour and are located downstream and in positions which alternate with the fixed rods 123.

The operation of this modified nozzle is substantially the same as that described above, with the streams of film-forming material delivered under periodically varying or pulsating pressure, being divided into separate flows as it moves past the fixed rods 123. During periods of minimum pressure application to the stream of film-forming material, portions of the separate flows merge or blend together, with the projections 124 encouraging lateral movement of such flows. The projections 124 extend only partially into the separate flows of film-forming material from either or, as illustrated, from both sides thereof and thus do not completely divide such flows.

The portions of the separate flows of film-forming material which remain unconnected define voids or openings in the film-forming material which is ultimately extruded from the nozzle discharge orifice. The net-like structure which is formed using the nozzle of FIGS. 2 and 3 is substantially the same as that provided by the nozzle shown in FIG. 1 and is likewise capable of being stretched to orient the molecules thereof.

Figure 4:
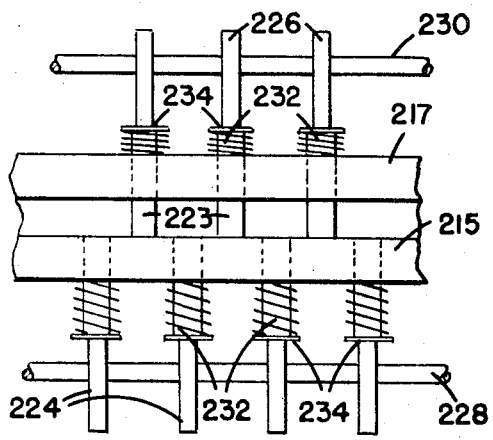
FIG. 4 is a view similar to FIG. 3 of a further embodiment of the apparatus of the present invention.

Turning to FIG. 4 of the drawing, the nozzle there illustrated includes die lips or blades 215 and 217 which extend between end walls, not shown, and together define a passage for a stream of film-forming material. A series of equally spaced rods 223 are adapted to be moved across the nozzle passage along a plane similar to that in which are located the fixed rods 23 of the nozzle shown in FIG. 1. As illustrated alternate rods 223 extend through and are movable relative to one of the nozzle blades, while the rods 223 adjacent thereto extend through and are movable relative to the other of such nozzle blades.

The rods 223 are adapted to be projected across the nozzle passage by cams 224 and 226, which are carried by driven shafts 228 and 230 respectively, with the projection of the rods 223 which extend through the nozzle blade 215 being simultaneous and alternating with the projection of the rods which extend through the nozzle blade 217. In other words, all of the rods 223 are simultaneously reciprocated, with the reciprocation of the rods 223 which extend through the nozzle blade 215 being 180° out of phase with the reciprocation of the rods 223 which extend through the nozzle blade 217. Each of the rods 223 is retracted by a separate compression spring 232 which encircles the same between a nozzle blade and a disk 234 fixed to the rod itself.

In the operation of the nozzle shown in FIG. 4, a stream of film-forming material is delivered into the nozzle passage under a constant pressure and is divided into separate streamlined flows by alternately projecting the rods 223 from one side of such passage and then from the other side thereof. More particularly, as the rods 223 extending through one of the nozzle blades are projected across the nozzle passage the stream of film-forming material is divided into separate flows. As such rods are retracted, the rods extending through the opposing nozzle blade are projected across the nozzle passage, dividing the separate streamline flows of film-forming material which were just previously formed and causing adjacent portions thereof to merge or blend together and form new streamlined flows.

With each projection of rods across the nozzle passage, voids or openings are formed in the stream of film-forming material moving therethrough. The film-forming material, shaped in this manner, is then set as it issues from the nozzle discharge orifice to provide a net-like structure.

The nozzle illustrated in FIG. 4 differs from those shown in FIGS. 1–3 not only in structure and operation but also in the form of the net-like structure, which is produced. Insofar as adjacent rods 223 of the nozzle shown in FIG. 4 are projected through the stream of film-forming material in an alternating sequence, the voids or openings which result from such projection are laterally offset from each other. Thus, in the net-like structure which results, the voids or openings of each row extending transversely of the structure are aligned with each other but are in offset or staggered relationship with adjacent of such rows of voids or openings.

Figure 5:
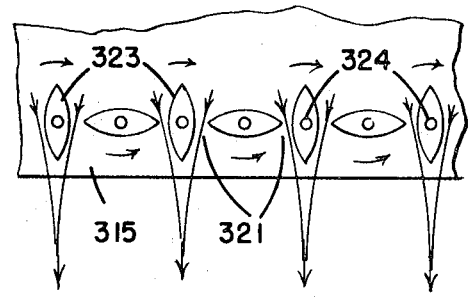
FIG. 5 is a view similar to FIG. 1 of a still further embodiment of the apparatus of the present invention.
Figure 6:
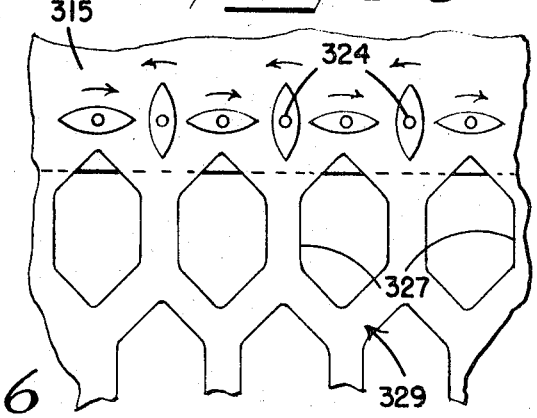
FIG. 6 is a view similar to FIG. 5 with elements thereof in another position of operation.

The nozzle shown in FIGS. 5 and 6 differs from that shown in FIG. 4 by employing rotatable, elongated deflectors 323 in lieu of movable rods. The deflectors 323 are of streamlined and symmetrical contour and are positioned between the nozzle blades, one of which is shown at 315.

Each deflector is fixed to a separate shaft 324, one end of which extends through a nozzle blade where it may be rotated, for example by having one gear of a train of meshing driven gears attached thereto. As illustrated, alternate deflectors 323 are together rotated in opposite directions to and in alternating sequence with the deflectors adjacent thereto between positions which are generally parallel and perpendicular to the stream of film-forming material 321. As with the nozzle of FIG. 4, the net-like structure 329 which is provided with the nozzle shown in FIGS. 5 and 6 includes voids or openings 327 which are in offset or staggered relationship.

I claim:

1. A method of making a net-like structure including the steps of delivering under a pulsating pressure a continuous stream of flowable film-forming material which is unconfined in only its direction of flow, obstructing the stream of film-forming material in a direction generally perpendicular to its direction of flow at areas which are spaced from each other in a direction transverse to the direction of stream flow to thereby divide the stream into a series of separate, generally parallel streamline flows of film-forming material, at locations beyond the areas of stream obstruction permitting portions of adjacent of such parallel streamline flows of film-forming material to move toward and merge with each other only at longitudinally spaced areas thereof as the pressure being applied to the continuous stream is minimized to thereby leave voids within the film-forming material, thereafter releasing the thus shaped film-forming material from all confinement, and setting the same to provide a net-like structure.

2. A method as defined in claim 1 further including the step of at least partially obstructing the streamline flows of film-forming material in a direction generally perpendicular to their direction of flow and substantially midway of their transverse dimensions to encourage movement of portions adjacent of such streamline flows toward each other.

3. A method of making a net-like structure including the steps of delivering under pressure a continuous stream of flowable film-forming material which is unconfined in only its direction of flow, obstructing the stream of film-forming material in a direction generally perpendicular to its direction of flow at areas which are spaced from each other in a direction transverse to the direction of stream flow, with the stream being first obstructed simultaneously and only at alternate of such areas and then simultaneously and only at areas adjacent to such alternate areas, continuously repeating the sequential obstruction of the stream of film-forming material whereby the stream is divided into a series of separate, generally parallel streamline flows of film-forming material and, at locations beyond the areas of stream obstruction, portions of adjacent of such streamline flows are also caused to merge with each other at longitudinally spaced areas thereof so as to leave voids within the film-forming material, thereafter releasing the thus shaped film-forming material from all confinement, and setting the same to provide a net-like structure.

4. Apparatus for making a net-like structure by extrusion including a nozzle having a passage which terminates with a continuous, unobstructed, elongated discharge orifice, means for delivering a continuous stream of flowable film-forming material under pressure into and through said passage, a plurality of generally like, spaced obstructions extending across said passage in directions substantially perpendicular to a plane passing longitudinally of said discharge orifice and serving to shape the stream of film-forming material into a series of separate streamline flows, means located upstream from the extrusion nozzle orifice for causing portions of each streamline flow of film-forming material to periodically move laterally toward and merge only at longitudinally spaced areas with adjacent of such flows at locations between said obstructions and said discharge orifice, and means outwardly of said nozzle for setting the film-forming material as it issues therefrom.

5. Apparatus as defined in claim 4 wherein said obstructions include a row of fixed rods which are spaced substantially equal distances from each other along a plane extending generally parallel to the nozzle extrusion orifice, and wherein said means for causing portions of adjacent streamline flows of film-forming material to periodically move laterally toward and merge with each other includes means for applying a pulsating pressure to the film-forming material as it is delivered to said passage and a plurality of spaced projections, said projections extending only partially into said nozzle passage and being disposed in alternating relationship with said rods, said projections being spaced at substantially equal distances from said discharge orifice.

6. Apparatus as defined in claim 4 wherein said obstructions include a series of rods spaced substantially equal distances from each other along a plane extending transversely of the nozzles and generally parallel to the nozzle extrusion orifice, and wherein said means for causing portions of adjacent streamline flows of film-forming material to periodically move laterally toward and merge with each other includes means for simultaneously reciprocating said rods across the nozzle passage with the movement of alternate of such rods being 180° out of phase with the rods adjacent thereto.

7. Apparatus as defined in claim 4 wherein said obstructions include a plurality of elongated, rotatable deflectors of streamlined and symmetrical contour, and wherein said means for causing the portions of adjacent streamline flows of film-forming material to periodically move laterally toward and merge with each other includes means for simultaneously rotating alternate of said deflectors in alternating sequence with deflectors adjacent thereto between positions extending parallel and perpendicular to a plane passing across said discharge orifice.

References Cited

UNITED STATES PATENTS

| | | | |
|---|---|---|---|
| 1,553,512 | 9/1925 | Borner | 25—17 |
| 2,402,281 | 6/1946 | Green | 264—177 |
| 3,252,181 | 5/1966 | Hureau | 264—177 |
| 3,280,847 | 10/1966 | Chisholm et al. | 264—167 |
| 3,372,920 | 3/1968 | Corbett et al. | 264—177 |

FOREIGN PATENTS

| | | | |
|---|---|---|---|
| 22,359 | 10/1911 | Great Britain | 25—17 |
| 380,369 | 9/1964 | Switzerland | 161—Net/dig. |
| 1,357,630 | 3/1964 | France | 18—12 |

ROBERT F. WHITE, Primary Examiner

JEFFERY R. THURLOW, Assistant Examiner

U.S. Cl. X.R.

18—12; 25—17; 264—176